(12) United States Patent
Klinke et al.

(10) Patent No.: US 7,495,359 B2
(45) Date of Patent: Feb. 24, 2009

(54) ACTUATOR

(75) Inventors: Norbert Klinke, Augustenborg (DK); Christian Platz, Haderslev (DK)

(73) Assignee: Linak A/S, Nordborg (DK)

( * ) Notice: Subject to any disclaimer, the term of this patent is extended or adjusted under 35 U.S.C. 154(b) by 514 days.

(21) Appl. No.: 10/555,437

(22) PCT Filed: May 6, 2004

(86) PCT No.: PCT/DK2004/000311

§ 371 (c)(1), (2), (4) Date: Nov. 3, 2005

(87) PCT Pub. No.: WO2004/100632

PCT Pub. Date: Nov. 18, 2004

(65) Prior Publication Data

US 2006/0279143 A1    Dec. 14, 2006

(30) Foreign Application Priority Data

May 6, 2003    (DK) .................................. 2003 00681

(51) Int. Cl.
*H02K 5/24* (2006.01)
(52) U.S. Cl. ............................... 310/51; 310/83; 310/89
(58) Field of Classification Search .................... 310/51, 310/83, 89, 91, 67 R, 75 R
See application file for complete search history.

(56) References Cited

U.S. PATENT DOCUMENTS

| 4,028,571 | A | * | 6/1977 | Dicke ........................... 310/89 |
| 4,616,151 | A | | 10/1986 | Pryjmak |
| 4,819,503 | A | * | 4/1989 | Fazi et al. .................... 248/632 |
| 5,497,039 | A | | 3/1996 | Blaettner et al. |
| 5,917,258 | A | * | 6/1999 | Kershaw et al. ............... 310/51 |
| 6,069,422 | A | | 5/2000 | Garrison et al. |
| 6,069,423 | A | | 5/2000 | Miller et al. |
| 6,739,004 | B1 | | 5/2004 | Abrahamsen et al. |
| 2003/0144104 | A1 | | 7/2003 | Ryberg |
| 2004/0239197 | A1 | * | 12/2004 | Tsuchiya ..................... 310/90 |

FOREIGN PATENT DOCUMENTS

| EP | 0577541 | 1/1994 |
| EP | 0848477 | 6/1998 |
| EP | 1320172 | 6/2003 |
| WO | 0229284 | 4/2002 |

\* cited by examiner

*Primary Examiner*—Gary F. Paumen
(74) *Attorney, Agent, or Firm*—Dykema Gossett PLLC

(57) ABSTRACT

In actuators where an electric motor, via a transmission, drives an activation element intended to cause movement of an adjustable element in the structure in which the actuator is incorporated, particularly within the furniture sector, hospital beds and sickbeds. The level of noise may be reduced in that at least the electric motor (6) is mounted in tightly fitting recess (12) in a block (11) of foam plastics or similar vibration/noise damping material. An additional reduction of vibrations/noise is achieved by inserting a claw coupling (9a, 9b) with a gasket of rubber or rubber-like material between the individual claws in the claw coupling.

11 Claims, 4 Drawing Sheets

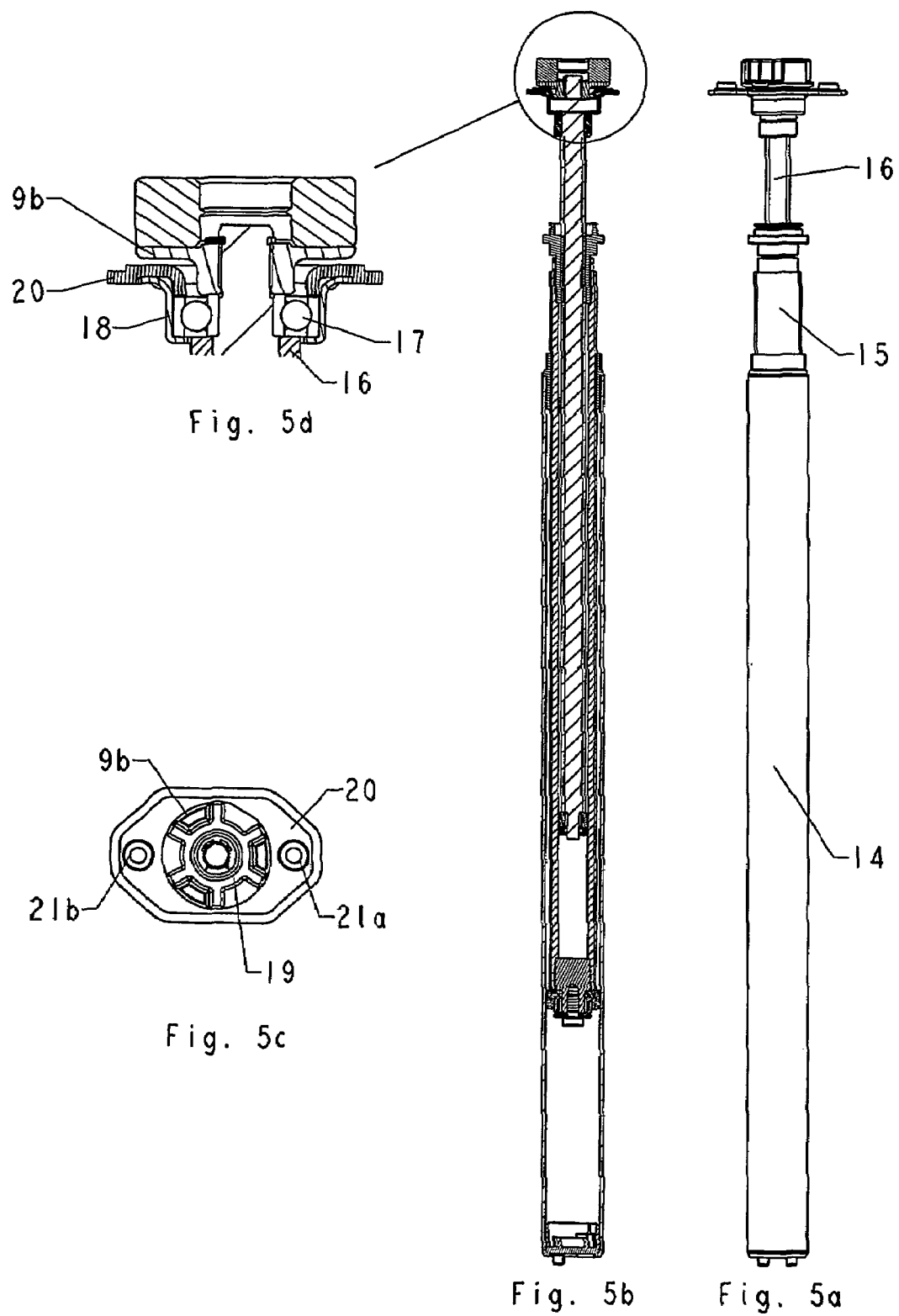

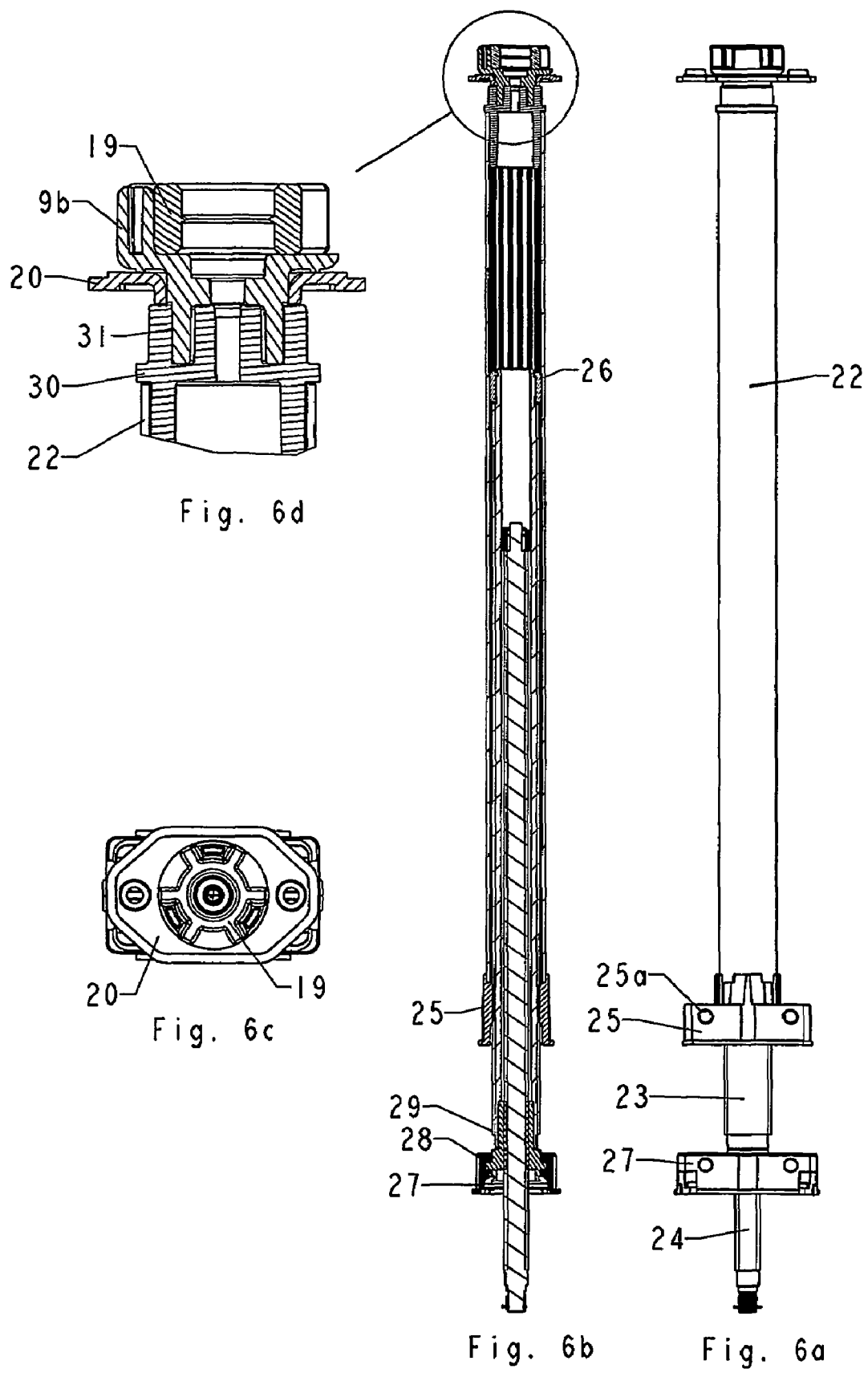

ACTUATOR

BACKGROUND OF THE INVENTION

1. Field of the Invention

The present invention relates to an actuator that includes a cabinet, an electric motor arranged in the cabinet, the motor having a motor shaft, a transmission connected to the motor shaft, the transmission having an output stage, and an activation element connected to the output stage of the transmission, the activation element being intended to cause movement of an adjustable element in the structure in which the actuator is incorporated.

2. The Prior Art

Actuators driven by a reversible low volt DC motor, typically 24V, are used for adjustable articles of furniture, such as beds, chairs and tables. In a linear actuator, the motor, via a transmission, drives a spindle having a nut fixed against rotation so that the nut can move to and fro on the spindle depending on the direction of rotation of the spindle. The nut has arranged thereon a tubular rod whose free end is provided with an attachment for securing in the structure. Typically, the transmission simply consists of a worm gear, where the worm is provided in extension of the motor shaft and the worm wheel secured directly on the spindle. An example is disclosed in WO 02/29284 to Linak A/S. A special structure of linear actuators is called lifting columns, e.g. intended as table legs. Rotary actuators have so far not been as common as linear actuators in connection with furniture, but a single example based on a specially constructed planetary gear is described in WO 01/17401 to Linak A/S. In the furniture business, the price of the actuators is a decisive factor, which has become particularly pronounced recently. This, of course, has resulted in a development toward simpler structures. In the furniture business in particular, an essential aspect is the level of noise, and with a demand for less expensive actuators, it is even more difficult to meet the requirement for low level noise.

During adjustment of the article of furniture, mechanical noise occurs, such as transmission noise, noise in the suspension of the adjustable element, noise because of vibrations that propagate in the structure, etc. When the most powerful single sources of noise have been remedied, it is a complex noise picture that emerges, it being very difficult, it not impossible, to locate the individual sources of noise.

In case of furniture, the level of noise is a significant factor in the sense that this must be as low as possible. This applies to beds, including hospital beds and sickbeds, as well as armchairs and tables, including desks. In the furniture structure and in the drive unit, various common noise-reducing measures may be taken, such as the use of rubber/plastics suspensions, plastics bushings, lubricants, etc. to counteract the noise, but in spite of this it is still desirable to reduce the level of noise additionally.

Some of the noise originates from the motor, where part of the noise is caused by the structure of the rotor with axis-parallel air gaps between the iron flanges on which the coils are wound. This gives small, but noticeable discontinuities in the magnetic field that cause vibrations which propagate in the structure and cause acoustic noise. To obviate the discontinuity, it has been proposed to twist the armature so that the air gap is not axis-parallel. The phenomenon is described in another connection in U.S. Pat. No. 4,616,151 to General Motors Corporation.

Another part of the noise from the motor is caused by an axial movement of the rotor, which likewise results in vibrations and thereby acoustic noise. Owing to manufacturing tolerances it is difficult to do anything about the problem. The phenomenon is also described in another connection inter alia in U.S. Pat. No. 5,497,039 to General Electric Company and U.S. Pat No. 6,069,422 to Fasco Industries, Inc., both of which propose solutions for fixing the rotor in the axial direction via the magnetic fields of the stator.

Another aspect of the acoustic noise is the transmission noise, part of which originates from the engagement between the gear wheels or more particularly the varying degree of the engagement. In this context, reference is made to WO 01/94732 A1 to VKR Holding A/S, which addresses noise problems in relation to window openers, focus being on noise caused by clearance between the components of the transmission, it being attempted to reduce the noise by controlled engagement between a worm and a worm wheel.

The outlined solutions are expensive and complicated or cannot readily be implemented in the present connection.

The invention is based on an ever increasing wish for reducing the noise level of linear actuators, bearing in mind that this must not lead to increased or noticeably increased costs.

SUMMARY OF THE INVENTION

This is achieved according to the invention in that the electric motor is mounted in a tightly fitting recess in a block of foam plastics or similar material arranged and secured in the cabinet. The foam plastics serve as a vibration and noise damper, and the foam plastics may additionally be given specific properties for a specific type of motor and transmission for maximum vibration/noise damping. In those cases where part of or the entire transmission is built together with the motor as a unit, the foam plastics block is expediently shaped so that the entire unit is received in its recess. The motor may be secured in the cabinet by traditional means, but if the structure otherwise so permits, it is expedient to shape it such that the motor is exclusively secured in the foam plastics block, which partly saves the traditionally securing means and partly provides for easy mounting of the motor when it is just to be arranged in the foam plastics block. When, thus, the motor is exclusively secured and enclosed in the foam block together with the transmission, the motor and transmission vibrations are ideally captured in the foam plastics and are not transferred to the cabinet. The heat generated by the motor, the transmission and possibly the brake is transferred to the cabinet. The foam block thus does not result in overheating of the motor part, but if it is desired to keep the temperature down, the foam plastics between the motor and the cabinet may be made thin at strategic locations to facilitate the heat transfer, but there is also the option of inserting heat conductive metal foils/sheets in the foam block out to the cabinet.

Expediently, the foam plastics block fills the interior of the cabinet entirely or substantially entirely, which results in easy mounting and simultaneously avoids resonance cavities and thereby contributes additionally to the vibration/noise damping. The foam plastics block may be composed of several parts, e.g. two parts with an assembling face in the longitudinal plane of the motor, preferably so that the motor may be arranged down in the recess on the one part and then the other part is arranged thereon. For mounting and manufacturing purposes it is expedient with a foam plastics block as one entity with a recess for the motor, said recess having an opening extending out to one end or side for insertion of the motor into the block.

In an embodiment of the invention, a claw coupling is present in the transmission or between the transmission and the activation element of the actuator, which makes the assembly particularly easy. The motor unit, i.e. motor with transmission part, may then merely be arranged with its part of the claw coupling loosely in the other part of the claw coupling. In a particularly expedient embodiment, a gasket of rubber or similar material is provided between the individual claws of the claw coupling. This ensures that vibrations/noise from the motor unit propagate/s into the structure, which additionally ensures that the structure is comparatively noiseless. The rubber or rubber-like material of which the gasket is made may also be given specific properties with a view to absorbing the vibrations that occur in the structure concerned.

An exemplary embodiment of the invention will be explained more fully below with reference to the accompanying drawings.

BRIEF DESCRIPTION OF THE DRAWINGS

FIG. 5a shows the spindle part of the drive unit of FIG. 2, FIG. 5b shows a longitudinal section in the spindle part of FIG. 5a, FIG. 5c shows the spindle part of FIG. 5a, seen directly from above, FIG. 5d shows a detail of the upper end of the spindle part, FIG. 6a shows the spindle part of the drive unit of FIG. 3, FIG. 6b shows a longitudinal section in the spindle part of FIG. 6a, FIG. 6c shows the spindle part of FIG. 6a, seen directly from above, and FIG. 6d shows a detail of the upper end of the spindle part.

DETAILED DESCRIPTION OF THE PREFERRED EMBODIMENT

Figures 1, 2, 3:
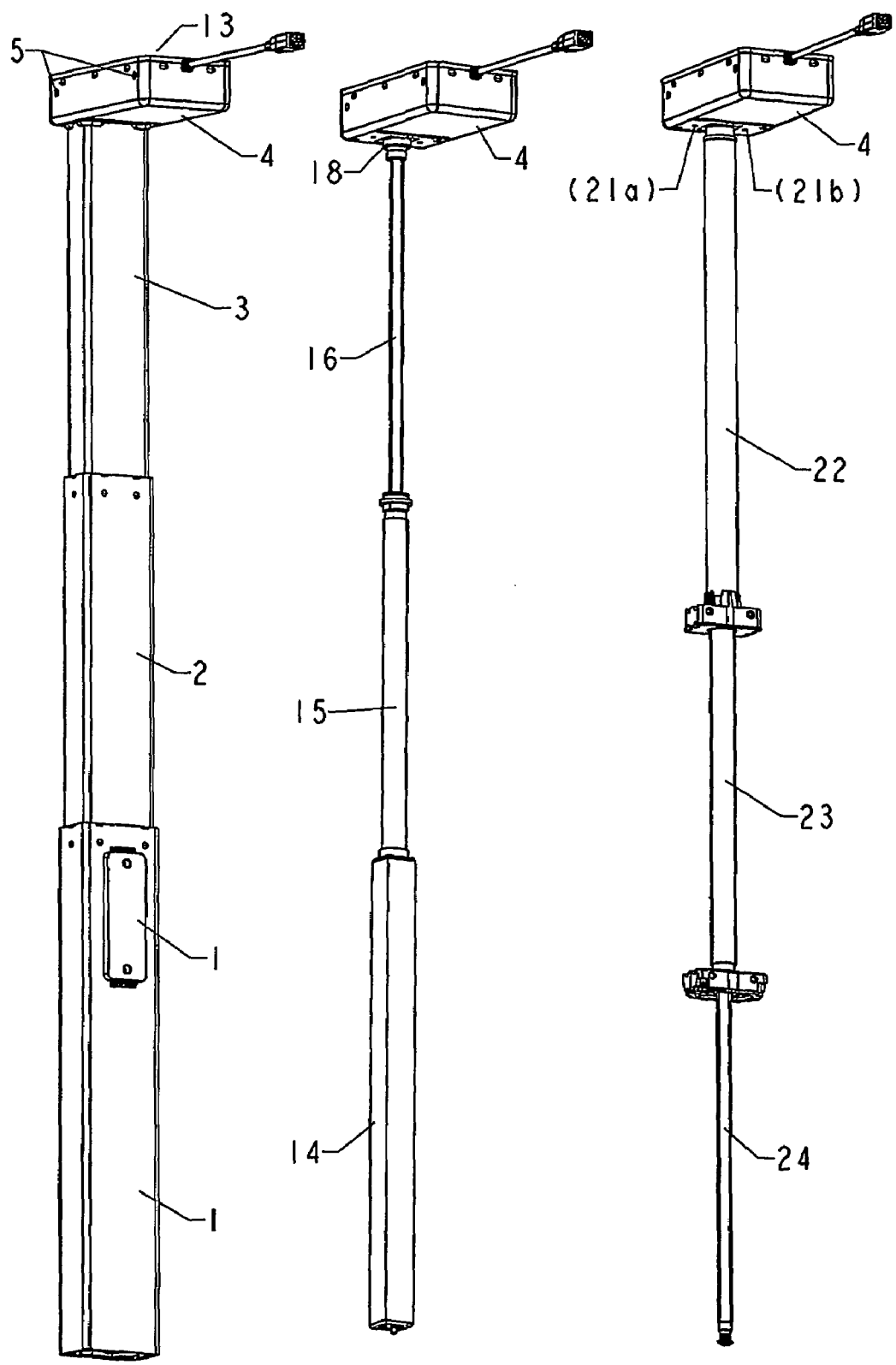
FIG. 1 shows a linear actuator in the form of a lifting column.
FIG. 2 shows a drive unit for the lifting column of FIG. 1.
FIG. 3 shows a drive unit for the lifting column of FIG. 1, intended for synchronous extension of the members, FIG. 4. shows an exploded view of a cabinet of the actuator.

FIG. 1 of the drawing shows a linear actuator in the form of a lifting column for height adjustable (sitting/standing) tables with three members 1, 2, 3 arranged telescopically inside each other, where the outer member 1 is intended for attachment in a foot at its lower end. On the upper end of the inner member 3 there is a cabinet 4 which extends perpendicularly from the wide side of the column. The sides and the end of the cabinet facing away are formed with holes 5 for the mounting of the tabletop/the frame which carries the tabletop. A bracket 1' for the mounting of a rim is provided on the wide side, at the top of the outer member 1. The column may be configured with a non-guided or a guided intermediate member 2. In case of a non-guided member 2, the inner member 1 is pushed out first, following which the intermediate member 2 is carried along via engagement. Owing to friction between the individual members, however, the movement of the intermediate member 2 may be more or less arbitrary. FIG. 2 shows a drive unit for non-guided movement of the intermediate member, and FIG. 3 shows a drive unit for synchronous movement of the inner and intermediate members 1, 2.

Figure 4:
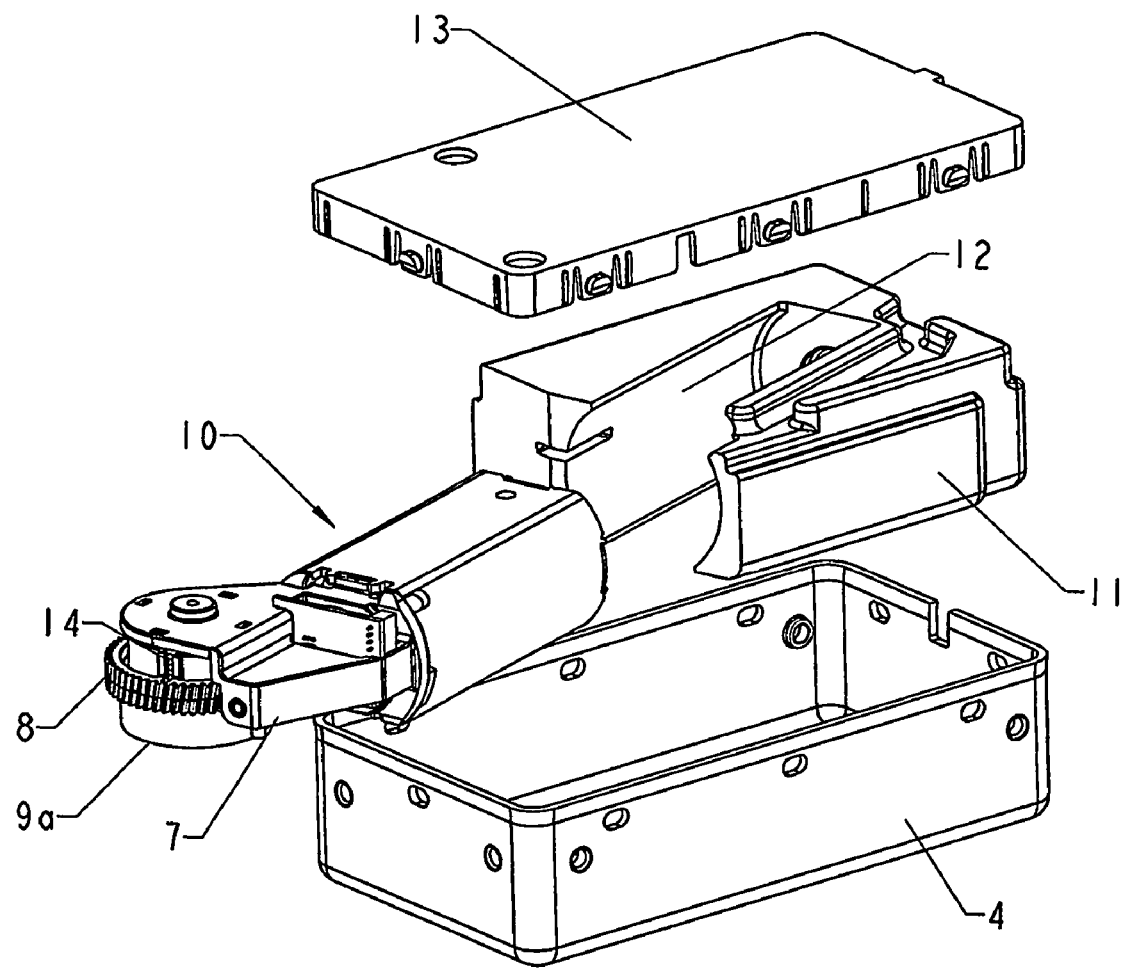

FIG. 4 shows an exploded view of the cabinet 4, which is of deep-drawn steel here. The motor unit 10 comprises a DC motor 6 having two plane, parallel sides. The front end of the motor includes a front bracket 7 of metal with a worm wheel (transmission) 8 in engagement with a worm, which is formed by an extension of the motor shaft. A screw spring 14 serving as a brake is mounted on the upwardly-facing side of the front bracket, cf. Danish Patent Application PA 2003 01650 to Linak A/S. One part of a claw coupling 9a is mounted on the downwardly facing side of the worm wheel 8.

The cabinet 4 accommodates a block of foam plastics 11, e.g., polyurethane, with a recess 12 for the motor part 1. The recess is configured tightly-fitting as far as the motor 6 itself and the adjoining part of the transmission are concerned. The worm wheel 8 is arranged here in front of the block. The foam plastics block fits snugly in the cabinet, i.e., fills the hollow of the cabinet where the block is arranged. Prior to the insertion of the foam plastics block, the motor part with the motor itself is moved into the recess that terminates at the front end of the block. Finally, a plastics cover 13 is mounted, having snap locking legs which engage recesses in the sides and ends of the cabinet intended for the purpose. Thus, the motor part is loose, exclusively enclosed in the foam block. The vibrations originating from motor and transmission are absorbed in the foam plastics and are not transferred to the cabinet. Thus, the foam plastics serves as a vibration and noise damper. The heat generated by motor and brake is transferred to the cabinet, there being an open space between the plane-parallel sides of the motor and the cabinet. As might have been expected, the foam block does not cause overheating of the motor part.

FIGS. 5a-5d show the spindle part of the drive unit in FIG. 2. The spindle part comprises an outer pipe 14 whose lower end is secured at the bottom of the outer member 1. A sleeve with interior threads for a hollow spindle 15 is secured at the top of the pipe 14, and also a sleeve with interior threads for a solid spindle 16 is secured at the top. A ball bearing 17 surrounded by a bearing bush 18 is secured on the end of the Solid spindle 16. The other part 9b of the claw coupling intended for engagement with the claw 9a on the motor unit is secured right out on the outer end of the solid spindle 16. A star-shaped element 19 of rubber is embedded in the other end 9b of the claw coupling so as to be disposed with the radially protruding arms between the claws of the two coupling parts. That is that the transfer of force between the two coupling parts 9a, 9b takes place via the rubber gasket 19, thereby ensuring completely or partially that vibrations/noise are/is passed from one part to the other, just as the rubber element absorbs irregularities in the connection.

The attachment to the cabinet 4 is carried out by a plate element 20 which is internally screwed firmly on to the bottom of the cabinet by two screws 21a, 21b through screw holes. The bottom of the housing is formed with a hole through which the bearing bushing is seated so that it is fixed with a four-sided flange between the inner side of the bottom and the plate element 20, which serves as a compressive safeguard for the load from the tabletop, while the bearing housing serves as a tensile safeguard.

FIGS. 6a-6d show the spindle part of the drive unit in FIG. 3 for synchronous guiding of the inner and intermediate members 2, 3. The spindle part comprises a drive pipe 22, a hollow spindle 23 and a solid spindle 24, secured with the lower end at the bottom of the outer member 1. An end element 25 is provided at the lower end of the drive pipe 22, having a passage with interior threads for the hollow spindle 23. The end element 25 fits in the lower end of the inner profile 3. The inner and intermediate members 3, 2 have interposed between them a frame with slides of plastics secured with pins in holes on the side wall of the inner member 3. The pins have been made so long that they are seated in holes 25a in the end element 25 for securing of this. A bushing 26 is secured at the upper end of the hollow spindle 23 and has protruding fins in engagement with grooves (splined connection) on the inner side of the drive pipe 22. Rotation of the drive pipe 22 will cause the hollow spindle 23 to be screwed out through the end element 25.

An end element 27 with a bearing 28 for the hollow spindle is secured to the lower end of the hollow spindle 23. The end of the hollow spindle has a sleeve 29 with threads in engagement with the solid spindle 24. When the hollow spindle rotates, it will screw itself up the solid spindle, while screwing itself out of the drive pipe, for which purposes the hollow spindle/solid spindle are provided with right-handed and left-handed threads, respectively. The end element 27 is secured in manner similar to the one described above with pins from slides, now between the intermediate member and the outer member 2, 1. Since the intermediate member 2 is secured to the lower end of the hollow spindle 23 via the end element, it is forcibly moved together with this, in a manner similar to what is shown and described e.g. in DE 39 10 814 to SMS Hasenclever GmbH, cf. FIG. 7B in particular, as well as FR 2 625 488 to ZW Hydraulik AG.

The upper end of the drive pipe 22 has secured thereto the other part 9b of the claw coupling intended for engagement with the part 9a from the motor unit 10. The claw coupling part 9b is secured to the drive pipe via an end plug 30 therein, said end plug having a spline for cooperation with the spline internally in the drive pipe. The end plug has a groove with a toothing on a protruding part, and the coupling part 9b has a corresponding ring wall 31 with a toothing that fits therewith for rotation-transferring interconnection. The coupling part is additionally secured by a centre screw in the end plug of the drive pipe.

In the same manner as before, a star-shaped element 19 of rubber is embedded in the other part 9b of the claw coupling so that it is disposed with the radially protruding arms (here six arms) between the claws of the two coupling parts, each of which has three claws. FIG. 6c shows the three claws from the spindle part, while the further spaces are intended to receive the three claws from the claw coupling part 9a of the motor part.

The attachment of the spindle part to the cabinet 4 is carried out here too with a plate member 20 which is internally screwed firmly on to the bottom of the cabinet by two screws through screw holes 21a, 21b. It will be appreciated that the drive pipe is secured in the axial direction between the end element 25 secured in the inner member 3 and the collar on the plate member 20 secured to the cabinet, which is moreover welded to the inner member 3.

Although the invention has been illustrated here in connection with an actuator constructed as a lifting column for height-adjustable tables, it will be appreciated that the invention is not restricted to this. Mounting of the motor in a foam plastics block in the cabinet and use of a claw coupling with rubber gasket may be used to advantage in other actuators, of course, and just to mention an example, linear actuators for adjustment of hospital beds and sickbeds or beds for domestic use.

The invention claimed is:

1. An actuator comprising a cabinet; a foam plastic block contained in the cabinet, said foam block defining a recess therein; and an electric motor tightly positioned in the recess of said foam block, said motor having a motor shaft, a transmission connected to the motor shaft, said transmission having an output stage, an activation element connected to the output stage of the transmission, said activation element being intended to cause movement of an adjustable element in a structure in which the actuator is incorporated.

2. The actuator according to claim 1, wherein at least a part of the transmission is built together with the motor, and this part of the transmission is likewise accommodated in the recess in the foam plastic block.

3. The actuator according to claim 1, wherein the foam plastic block fills an interior of the cabinet entirely or substantially entirely.

4. The actuator according to claim 1, wherein the foam plastic block is composed of two parts with an assembling face in a longitudinal plane of the motor.

5. The actuator according to claim 1, wherein the foam plastic block is one piece, and the recess has an opening extending out to an outer side of the block for insertion of at least the motor.

6. The actuator according to claim 1, wherein a claw coupling is arranged in the transmission or between the transmission and the activation element of the actuator.

7. The actuator according to claim 6, wherein a gasket of rubber is provided between the individual claws of the claw coupling.

8. The actuator according to claim 6, wherein the two parts of the claw coupling have three axially extending claws each, and the gasket has six protruding flaps from a central ring wall or solid core.

9. The actuator according to claim 1 including a spindle part, and one end of the claw coupling is secured to the end of the spindle part.

10. The actuator according to claim 1 including a spindle part with a drive pipe for rotation of a spindle, and the claw coupling is secured to one end of the drive pipe.

11. The actuator according to claim 9, wherein the spindle part is secured to the cabinet by means of a plate member screwed firmly on to bottom of the cabinet.

* * * * *